US012515459B2

(12) United States Patent
Takeuchi

(10) Patent No.: US 12,515,459 B2
(45) Date of Patent: Jan. 6, 2026

(54) PRINTING APPARATUS

(71) Applicant: SEIKO EPSON CORPORATION, Tokyo (JP)

(72) Inventor: Katsuo Takeuchi, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 165 days.

(21) Appl. No.: 18/621,198

(22) Filed: Mar. 29, 2024

(65) Prior Publication Data

US 2024/0326464 A1 Oct. 3, 2024

(30) Foreign Application Priority Data

Mar. 31, 2023 (JP) ................................ 2023-057592

(51) Int. Cl.
*B41J 2/35* (2006.01)
*B41J 2/355* (2006.01)
*B41J 29/38* (2006.01)

(52) U.S. Cl.
CPC .................................. *B41J 2/3558* (2013.01)

(58) Field of Classification Search
CPC ......... B41J 2/3558; B41J 29/38; B41J 29/393
See application file for complete search history.

(56) References Cited

U.S. PATENT DOCUMENTS

2021/0306502 A1* 9/2021 Ishiyama ........... H04N 1/00901
2022/0283755 A1 9/2022 Mori et al.

FOREIGN PATENT DOCUMENTS

JP 5978640 B2 * 8/2016
JP 2022-133585 A 9/2022
WO WO-2005022369 A1 * 3/2005 ............. G06F 1/325

OTHER PUBLICATIONS

Takamatsu, Machine TranslationofJP-5978640-B2, 2016 (Year: 2016).*
Niwa, Machine TranslationofWO-2005022369-A1, 2005 (Year: 2005).*

* cited by examiner

*Primary Examiner* — Scott A Richmond
(74) *Attorney, Agent, or Firm* — Global IP Counselors, LLP

(57) ABSTRACT

A printing apparatus operates by receiving power from a USB PD adapter outputting a DC voltage. The printing apparatus includes a first printing section configured to perform printing on a medium, a second printing section configured to perform printing on the medium, and a negotiation information obtainer configured to obtain negotiation information between the printing apparatus and the USB PD adapter. The negotiation information includes a rated power value. When the rated power value is less than the first predetermined value, the second printing section is configured to not perform printing on the medium during a time period in which the first printing section performs printing on the medium, and the first printing section is configured to not perform printing on the medium during a time period in which the second printing section performs printing on the medium.

4 Claims, 5 Drawing Sheets

PRINTING APPARATUS

The present application is based on, and claims priority from JP Application Serial Number 2023-057592, filed Mar. 31, 2023, the disclosure of which is hereby incorporated by reference herein in its entirety.

BACKGROUND

1. Technical Field

The present disclosure relates to a printing apparatus.

2. Related Art

As disclosed in JP-A-2022-133585, a printing apparatus that receives power from a power supply compliant with the Universal Serial Bus (USB) Power Delivery (PD) standard is known.

For the printing apparatus that receives power from a power supply compliant with the USB PD standard as described in JP-A-2022-133585, the user may have already possessed many power supplies. Therefore, in the perspective of responsible consumption and production, which is one of the Sustainable Development Goals (SDGs), efforts are undertaken to reduce attachment of the power supply to a printing apparatus and shipment of the power supply with a printing apparatus. However, when, for the printing apparatus, the user uses a power supply that has already been possessed by himself, the specifications of the power supply are non-specific. This results in a new issue that the stability of operations of the printing apparatus might decrease.

SUMMARY

According to an aspect of the present disclosure, provided is a printing apparatus that operates by receiving power from a Universal Serial Bus (USB) Power Delivery (PD) adapter outputting a direct current (DC) voltage according to USB PD standard, the USB PD adapter being not included with the printing apparatus, the printing apparatus including: a first printing section configured to perform printing on a medium; a second printing section configured to perform printing on the medium; and a negotiation information obtainer configured to obtain negotiation information between the printing apparatus and the USB PD adapter. The negotiation information includes a rated power value able to be supplied from the USB PD adapter. When the rated power value is greater than or equal to a first predetermined value, the first printing section and the second printing section are configured to simultaneously perform printing on the medium. When the rated power value is less than the first predetermined value, the second printing section is configured to not perform printing on the medium during a time period in which the first printing section performs printing on the medium, and the first printing section is configured to not perform printing on the medium during a time period in which the second printing section performs printing on the medium.

DESCRIPTION OF EMBODIMENTS

Embodiments according to the present disclosure will be described below with reference to the accompanying figures. The figures referred to herein are drawn for convenience of illustration. The present embodiments described below do not unreasonably limit the content of the present disclosure described in the appended claims. In addition, all of the configurations described below are not necessarily essential to the present disclosure.

1. Functional Configuration of Printing Apparatus

Figure 1:
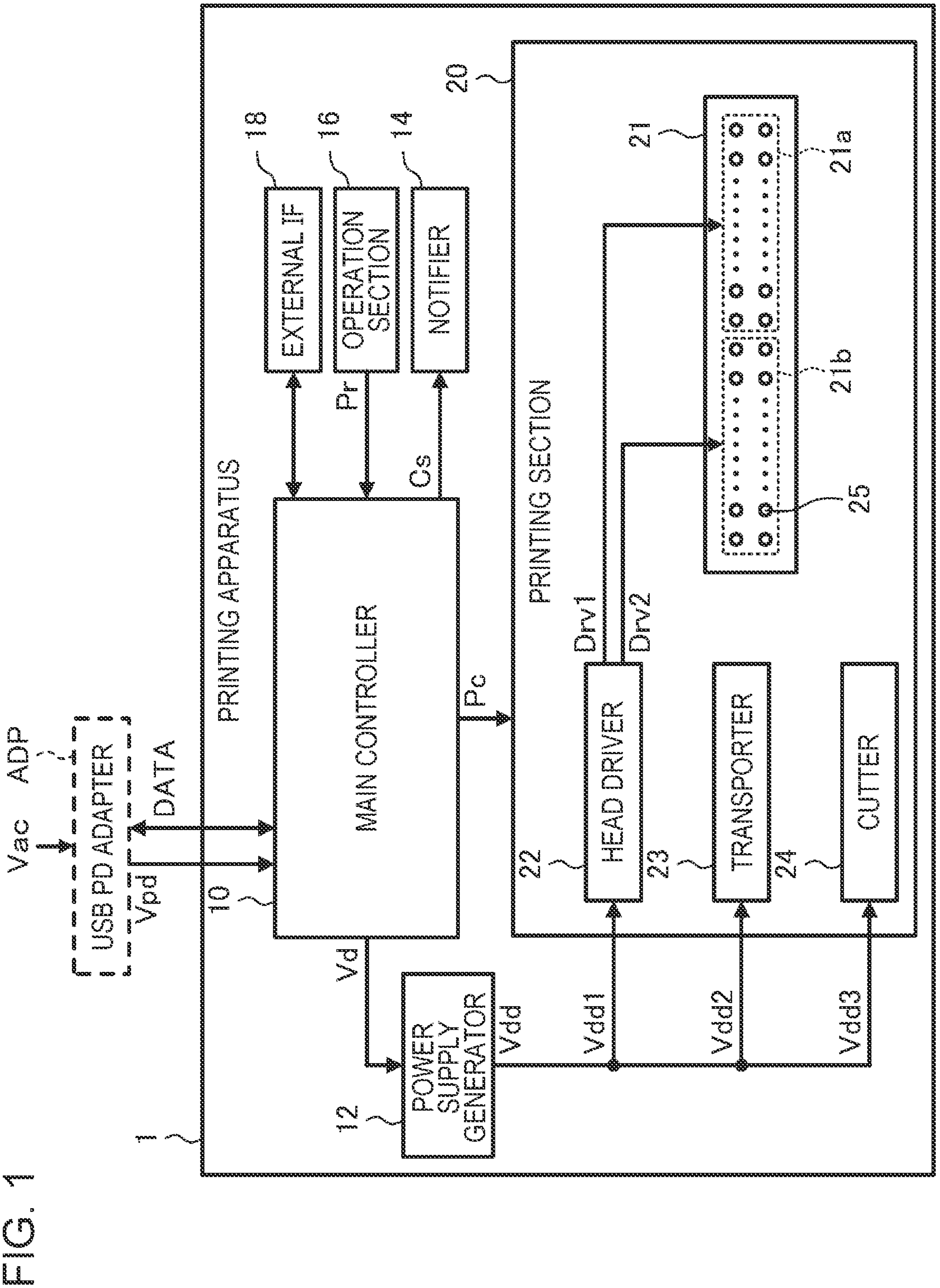
FIG. 1 is a diagram illustrating an exemplary functional configuration of a printing apparatus.

A description of the functional configuration of a printing apparatus 1 is given below. FIG. 1 is a diagram illustrating an exemplary functional configuration of the printing apparatus 1. The printing apparatus 1 according to the present embodiment is a so-called thermal printer that applies heat to a desired location of thermal roll paper, which is a medium, to perform printing on the medium. The printing apparatus 1 operates by receiving power from a Universal Serial Bus Power Delivery (USB PD) adapter ADP that converts the alternating-current (AC) voltage Vac of the utility power supply to a voltage signal Vpd of a direct current (DC) voltage compliant with the USB PD standard to output the converted voltage signal Vpd. The printing apparatus 1 is not limited to a thermal printer and may be a so-called ink jet printer that ejects ink onto a desired location of a medium to perform printing. In addition, the USB PD adapter ADP, which outputs a DC voltage compliant with the USB PD standard, may be, for example, a transformer that changes the AC voltage Vac of the utility power supply to output a DC voltage compliant with the USB PD standard, or may be an electronic device, such as a personal computer or a tablet computer, capable of outputting the DC voltage compliant with the USB PD standard.

In addition, the USB PD adapter ADP that supplies the voltage signal Vpd as driving power to the printing apparatus 1 is not included with the printing apparatus 1 according to the present embodiment. Here, the USB PD adapter ADP not being included with the printing apparatus 1 means that the USB PD adapter ADP is not included with the printing apparatus 1 at the time of at least one of shipment and delivery of the printing apparatus 1. Examples of such a case include the case where the USB PD adapter ADP is not shipped with the printing apparatus 1 at the time of at least one of shipment and delivery of the printing apparatus 1. Therefore, the printing apparatus 1 according to the present embodiment operates by receiving power from the USB PD adapter ADP with non-specific specifications, which is, for example, a general-purpose USB PD adapter ADP in the possession of the user or installer of the printing apparatus 1.

The printing apparatus 1 includes a main controller 10, a power supply generator 12, a notifier 14, an operation section 16, an external interface (IF) 18, and a printing section 20.

A communication data signal DATA and the voltage signal Vpd are input from the USB PD adapter ADP provided outside the printing apparatus 1 to the main controller 10.

The communication data signal DATA is a signal for performing mutual communication between the printing apparatus 1 and the USB PD adapter ADP, and examples of the communication data signal DATA include a signal for causing a negotiation process to be performed between the main controller 10 and the USB PD adapter ADP and a signal of propagating information between the main controller 10 and the USB PD adapter ADP. The voltage signal Vpd functions as a power supply voltage for the main controller 10 and the printing apparatus 1. In addition, the main controller 10 outputs the voltage signal Vpd as a voltage signal Vd to the power supply generator 12.

The term "negotiation process" used herein refers to a process of determining a voltage value and a maximum current value supplied to the printing apparatus 1 from one or more combinations of voltage values and maximum current values that the USB PD adapter ADP is able to output. Through the negotiation process, the voltage value of the voltage signal Vpd output by the USB PD adapter ADP, which is the voltage value of the voltage signal Vpd input to the printing apparatus 1, is determined. The details of the negotiation process will be described later.

In addition, a printing request signal Pr is input from the operation section 16 to the main controller 10.

The operation section 16 includes one or more operating switches. Upon the user operating the operating switches, the printing apparatus 1 receives various types of requests of the user. Then, the operation section 16 outputs a signal in accordance with the information received in response to the operation of the user, which is, for example, the printing request signal Pr in accordance with the information on an image to be printed on a medium, to the main controller 10. The main controller 10 generates a printing control signal Pc for controlling operations of the printing section 20 in accordance with the printing request signal Pr input from the operation section 16 and outputs the printing control signal Pc to the printing section 20.

In addition, the main controller 10 generates a notification information signal Cs for notifying the user of various types of information including an operating state of the printing apparatus 1 and outputs the notification information signal Cs to the notifier 14. The notifier 14 notifies the user of information in accordance with the input notification information signal Cs. That is, the printing apparatus 1 includes the notifier 14 that notifies the user of information. The notifier 14 used in such a manner may have a configuration including one or more light-emitting elements that notifies the user of information by being switched on, flashing, or being switched off, or may have a configuration including a display, such as a liquid crystal panel or an electroluminescent (EL) panel. In addition, the notifier 14 and the operation section 16 may be integrally configured as a so-called touch panel.

The external IF 18 corresponds to an interface circuit for communicating with an external device provided outside the printing apparatus 1. For example, when the printing apparatus 1 and an external device are communicatively coupled using communication compliant with the USB communication standards, the external IF 18 includes an interface circuit and a connector compliant with the USB communication standards; alternatively, when the printing apparatus 1 and an external device are communicatively connected using wireless communication, the external IF 18 includes a wireless communication module and an antenna compliant with the wireless communication standards, which are communication standards such as Wi-Fi (registered trademark) or Bluetooth (registered trademark).

In addition, examples of the external device communicatively coupled (or connected) to the printing apparatus 1 via the external IF 18 include a personal computer, a tablet computer, a smartphone, a display, and a handy scanner. The printing apparatus 1 may perform various types of processing including print processing in accordance with information input by a user operation on an external device in addition to a user operation on the operation section 16.

The power supply generator 12 generates a voltage signal Vdd with a predetermined voltage value by increasing or decreasing the voltage value of a voltage signal Vd output by the main controller 10 and outputs the voltage signal Vdd. The power supply generator 12 in such a manner is configured to include a direct current (DC)-DC converter. The voltage signal Vdd output by the power supply generator 12 is supplied as a voltage signal Vdd1 to the head driver 22 described later included in the printing section 20, is supplied as a voltage signal Vdd2 to a transporter 23 described later included in the printing section 20, and is supplied as a voltage signal Vdd3 to a cutter 24 described later included in the printing section 20. At this point, the voltage signals Vdd1, Vdd2, and Vdd3 output by the power supply generator 12 may have the same voltage value or may have different voltage values. That is, the power supply generator 12 may include a plurality of DC-DC converters that output the voltage signals Vdd1, Vdd2, and Vdd3, respectively. In addition, the power supply generator 12 may supply the voltage signal Vdd to various configurations including the notifier 14, the operation section 16, and the external IF 18, which are included in the printing apparatus 1, in addition to the head driver 22, the transporter 23, and the cutter 24.

The printing section 20 includes the thermal head 21, the head driver 22, the transporter 23, and the cutter 24. In addition, the thermal head 21 includes a plurality of heating elements 25.

The transporter 23 transports a medium under control of the main controller 10. That is, the printing apparatus 1 includes the transporter 23 that transports a medium. The transporter 23 includes transport rollers (not illustrated) that support or sandwich a medium. The transport rollers included in the transporter 23 are rotationally driven under control of the main controller 10. Then, as the transport rollers are rotationally driven, the medium supported or sandwiched by the transport rollers is transported at a predetermined transport speed along a predetermined transport direction.

The cutter 24 cuts a medium under control of the main controller 10 to obtain a predetermined-size portion. The cutter 24 includes a fixed blade and a movable blade, which are not illustrated. The fixed blade is fixed at a predetermined cutting location, and the movable blade moves between a predetermined standby location and the predetermined cutting location. Then, when a medium being transported by the transporter 23 reaches a predetermined size, the movable blade of the cutter 24 moves under control of the main controller 10 to the predetermined cutting location and moves to come into contact with the fixed blade. Thereby, a predetermined-size portion is cut from the medium being transported.

The head driver 22 outputs driving signals Drv1 and Drv2 to each of a plurality of heating elements 25 included in the thermal head 21 under control of the main controller 10.

The driving signal Drv1 controls whether to supply a driving voltage to each of the heating elements 25 included in the heating element group 21*a*. Thereby, the driving state of whether or not heat is generated in each of the heating elements 25 included in the heating element group 21*a* is controlled. In addition, the driving signal Drv2 controls whether to supply a driving voltage to each of the heating elements 25 included in the heating element group 21*b*. Thereby, the driving state of whether or not heat is generated in each of the heating elements 25 included in the heating element group 21*b* is controlled. That is, the head driver 22 divides a plurality of heating elements 25 included in the thermal head 21 into two driving units, the heating element group 21*a* and the heating element group 21*b*, and, for each of the divided driving units, individually controls whether to drive the heating elements 25 included in the heating element group 21*a* and whether to drive the heating elements 25 included in the heating element group 21*b*.

The plurality of heating elements 25 included in the thermal head 21 are disposed adjacent to each other in a direction perpendicular to a transport direction in which a medium is transported. Under control of the main controller 10, the head driver 22 outputs the driving signals Drv1 and Drv2 and the transporter 23 transports the medium. Thereby, heat generated by the heating elements 25 is applied at a desired location of the thermal roll paper, which is the medium. As a result, a desired character or image is formed on the medium.

As described above, the printing section 20 according to the present embodiment includes the thermal head 21 including a plurality of heating elements 25 such that the thermal head 21 includes the heating element group 21*a* including some of the plurality of heating elements 25 and the heating element group 21*b* in which some of the plurality of heating elements 25 are different. Then, the plurality of heating elements 25 included in the heating element group 21*a* and the plurality of heating elements 25 included in the heating element group 21*b* generate heat under control of the head driver 22, thereby forming a desired character or image on a medium, which is thermal roll paper. That is, the thermal head 21 included in the printing apparatus 1 includes the heating element group 21*a*, which performs printing on a medium, and the heating element group 21*b*, which performs printing on the medium.

In the printing apparatus 1 according to the present embodiment as described above, the head driver 22 divides a plurality of heating elements 25 included in the thermal head 21 into the driving units, the heating element group 21*a* and the heating element group 21*b*, and individually controls each of the driving units. Furthermore, the head driver 22 controls the thermal head 21 so that the heating element group 21*a* and the heating element group 21*b* simultaneously perform printing. This may reduce the time for the printing apparatus 1 to perform print processing. The head driver 22 also controls the thermal head 21 so that the heating element group 21*b* does not perform printing on a medium in a time period during which the heating element group 21*a* performs printing on the medium and that the heating element group 21*a* does not perform printing on a medium in a time period during which the heating element group 21*b* performs printing on a medium in a time period during which the heating element group 21*b* performs printing on the medium. This may reduce the power consumption used when the printing apparatus 1 performs the print processing. That is, the printing apparatus 1 selects and performs print processing that is appropriate in accordance with the state of the printing apparatus 1 and a request of the user.

Here, in the description given below, print processing in which the heating element group 21*a* and the heating element group 21*b* simultaneously perform printing on a medium will be referred to as collective print processing, whereas print processing in which the heating element group 21*b* does not perform printing on a medium in a time period during which the heating element group 21*a* performs printing on the medium and in which the heating element group 21*a* does not perform printing on a medium in a time period during which the heating element group 21*b* performs printing on the medium will be referred to as division print processing. The head driver 22 may perform control such that the plurality of heating elements 25 included in the thermal head 21 are divided into three or more driving units. At this point, the division print processing described above may be referred to as two-division print processing or three-division print processing in accordance with the number of divisions into which the driving units of the plurality of heating elements 25 included in the thermal head 21 are divided.

As described above, the printing apparatus 1 according to the present embodiment operates by receiving power from the USB PD adapter ADP, which outputs the voltage signal Vpd of the voltage according to the USB PD standard, thereby printing a desired image on a medium.

2. Functional Configuration of Main Controller

Figure 2:
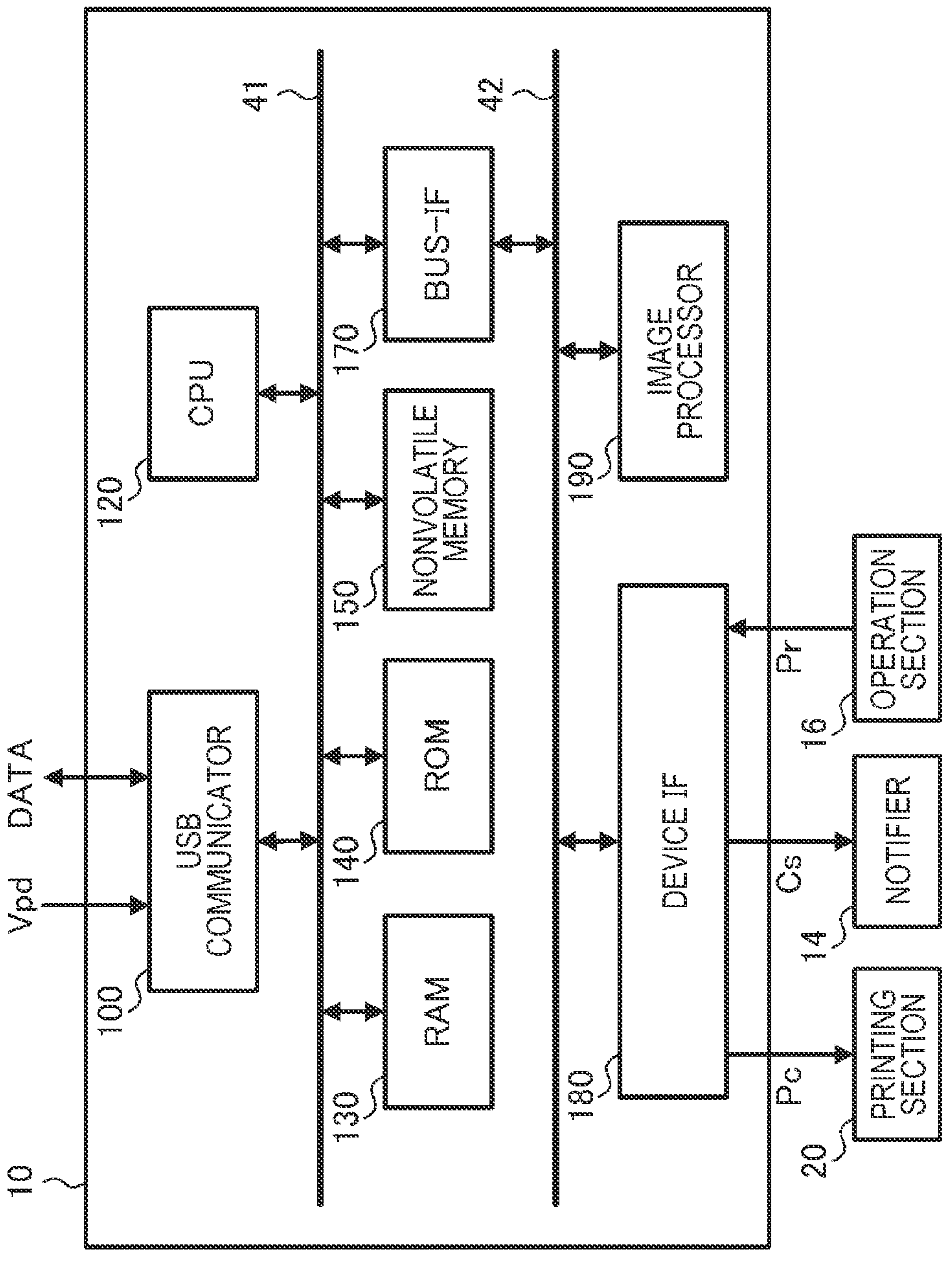
FIG. 2 is a diagram illustrating an exemplary functional configuration of a main controller.

The functional configuration of the main controller 10 will now be described. FIG. 2 is a diagram illustrating an exemplary functional configuration of the main controller 10. As illustrated in FIG. 2, the main controller 10 includes a USB communicator 100, a central processing unit (CPU) 120, a random access memory (RAM) 130, a read-only memory (ROM) 140, a nonvolatile memory 150, a BUS-IF 170, a device IF 180, and an image processor 190.

The CPU 120 is responsible for the main control of the printing apparatus 1. The CPU 120 is electrically coupled via a system bus 41 to the USB communicator 100, the RAM 130, the ROM 140, the nonvolatile memory 150, and the BUS-IF 170. The main controller 10 may include, in place of the CPU 120 or in addition to the CPU 120, hardware such as a field-programmable gate array (FPGA).

The RAM 130 is a memory readable and writable at any time for providing a work area of the CPU 120. The RAM 130 may be used as an image memory for temporarily storing image data and the like included in the printing request signal Pr. The ROM 140 is, for example, a boot ROM in which a boot program to be executed by the printing apparatus 1 and the main controller 10 are stored. The nonvolatile memory 150, which is, for example, an electrically erasable programmable read-only memory (EEPROM) or a flash memory, stores system software, setting value data, and so on that are to be maintained after the shut-off of the power of the printing apparatus 1.

The USB communicator 100 receives the communication data signal DATA output by the USB PD adapter ADP, converts the communication data signal DATA into a predetermined signal format to be used by the printing apparatus 1, and outputs the converted communication data signal DATA to the CPU 120. In addition, the USB communicator 100 converts a signal output by the CPU 120 into a predetermined signal format to be used for communication with the USB PD adapter ADP and outputs the converted signal as the communication data signal DATA to the USB PD adapter ADP.

The BUS-IF 170 is an interface that electrically couples the system bus 41 and the image bus 42. The BUS-IF 170 functions as a bus bridge for converting a data structure between the data structure of a signal propagating via the system bus 41 and the data structure of a signal propagating via the image bus 42.

The device IF 180 is an interface circuit that couples the main controller 10 to the printing section 20, the notifier 14, and the operation section 16. The device IF 180 is capable of converting various types of data into synchronous or asynchronous data in accordance with data used in the printing section 20, the notifier 14, and the operation section 16.

The image processor 190 performs predetermined image processing on image data included in the printing request signal Pr input via the operation section 16. Then, a signal in accordance with the image data to which the image processor 190 has applied image processing is output as the printing control signal Pc via the device IF 180 to the printing section 20.

Although not illustrated in the figure, the main controller 10 may include an external IF control circuit that controls the external IF 18 described above and outputs a signal according to the communication method of the external IF 18.

Figure 3:
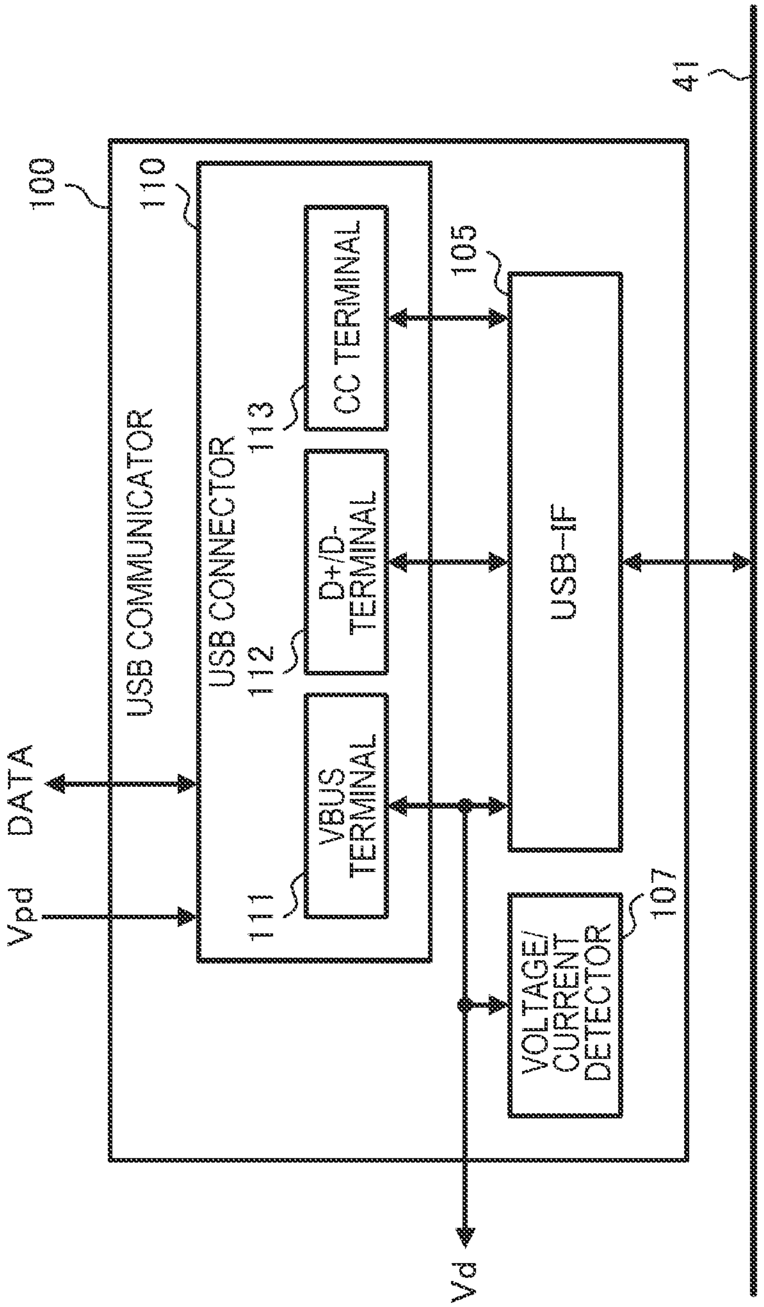
FIG. 3 is a diagram illustrating an exemplary functional configuration of a USB communicator.

A specific example of the configuration of the USB communicator 100 included in the main controller 10 will now be described. FIG. 3 is a diagram illustrating an exemplary functional configuration of the USB communicator 100. As illustrated in FIG. 3, the USB communicator 100 includes a USB-IF 105, a USB connector 110, and a voltage/current detector 107.

The USB-IF 105 converts a signal compliant with the USB communication standards, such as the communication data signal DATA, which is input via the USB connector 110, to a signal in a predetermined signal format that is used in the main controller 10. Then, the USB-IF 105 outputs the converted signal to the CPU 120 via the system bus 41. In addition, the USB-IF 105 converts the signal input from the CPU 120 to a signal compliant with the USB communication standards. Then, the USB-IF 105 outputs the converted signal, as the communication data signal DATA, to the USB PD adapter ADP via the USB connector 110. Here, examples of the signal compliant with the USB communication standards include a differential serial signal, and examples of the signal in a predetermined signal format that is used in the main controller 10 include a signal compliant with the Inter-Integrated Circuit (I2C) communication, and a parallel signal.

The USB connector 110 is a connector compliant with the USB Type-C standard and includes a VBUS terminal 111, a D+/D− terminal 112, and a configuration channel (CC) terminal 113.

The VBUS terminal 111 is a terminal that supplies power to the printing apparatus 1 and to which the voltage signal Vpd output by the USB PD adapter ADP is input.

The D+/D− terminal 112 is an input/output terminal for mutual communication with the USB PD adapter ADP. Examples of the D+/D− terminal 112 include a D+/D− terminal to and from which a signal for low-speed data communication as per USB 2.0 is input and output, a TX1+/TX1− terminal, an RX1+/RX1− terminal, a TX2+/TX2− terminal, an RX2+/RX2− terminal, and so on to and from which a signal for high-speed data communication as per USB 3.1 is input and output.

The CC terminal 113 is a terminal for establishing a coupling state between the printing apparatus 1 and the USB PD adapter ADP and is used for detecting the coupling of the USB cable coupled to the USB connector 110, detecting the plug surface of the coupled USB cable, and so on and for establishing the source-sink relationship between the printing apparatus 1 and the USB PD adapter ADP. In addition, the CC terminal 113 is also used for a negotiation process compliant with the USB PD standard between the printing apparatus 1 and the USB PD adapter ADP.

The voltage/current detector 107 detects the voltage value of the voltage signal Vpd input via the USB connector 110 and the value of a current resulting from the propagation of the voltage signal Vpd and determines whether the detected voltage value of the voltage signal Vpd and the detected value of the current resulting from the propagation of the voltage signal Vpd are within predetermined ranges, respectively. Then, the voltage/current detector 107 notifies the CPU 120 via the USB-IF 105 of a result of determining whether the voltage value of the voltage signal Vpd and the value of the current resulting from the propagation of the voltage signal Vpd are within the respective predetermined ranges. That is, the voltage/current detector 107 detects the voltage value of the voltage signal Vpd supplied from the USB PD adapter ADP and the value of a current resulting from the propagation of the voltage signal Vpd. In other words, the voltage/current detector 107 detects the amount of power supplied from the USB PD adapter ADP.

3. Operations of Printing Apparatus

Operations of the printing apparatus 1 configured as described above will be described. As described above, the printing apparatus 1 according to the present embodiment is a thermal printer that operates by receiving power from the USB PD adapter ADP that converts the AC voltage Vac of commercial power to the DC voltage according to the USB PD standard and outputs the voltage signal Vpd of the converted DC voltage. The USB PD adapter ADP that supplies the voltage signal Vpd, as driving power, to the printing apparatus 1 is not included with the printing apparatus 1. Therefore, the printing apparatus 1 according to the present embodiment operates by using the general-purpose USB PD adapter ADP compliant with the USB PD standard in the possession of the user or installer.

However, because the USB PD adapter ADP of the user or installer is a general-purpose adapter in which the specifications and state of the USB PD adapter ADP are not specific, sufficient power may not be supplied to the printing apparatus 1, which may in turn result in unstable operations of the printing apparatus 1.

With the printing apparatus 1 according to the present embodiment, the possibility of a decrease in the stability of operations of the printing apparatus 1 due to the specifications and state of the USB PD adapter ADP may be reduced. As a result, the printing apparatus 1 that operates stably may be provided even when the USB PD adapter ADP is not included with the printing apparatus 1.

3.1 Negotiation Process

Figure 4:
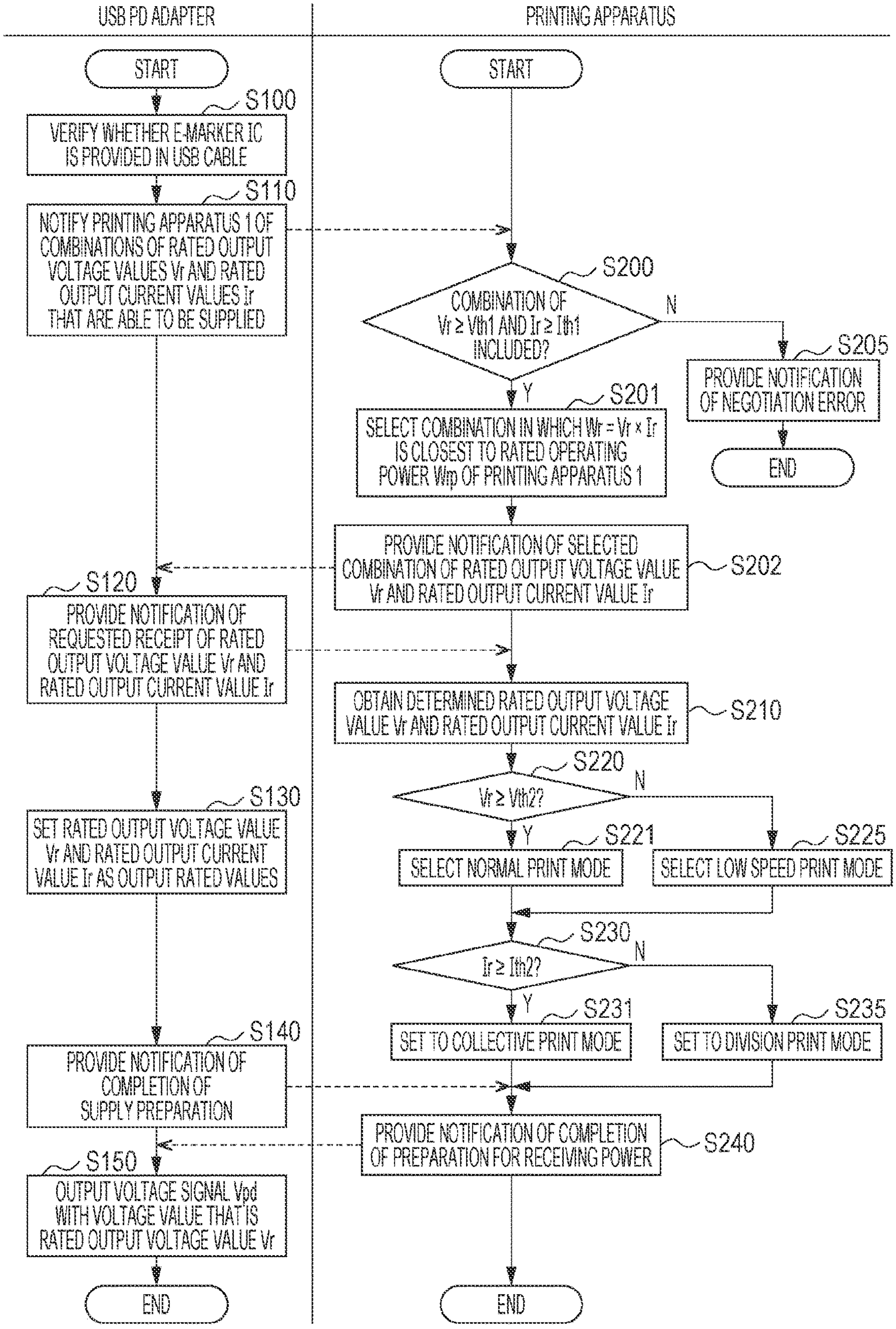
FIG. 4 includes flowcharts illustrating an exemplary negotiation process between the USB PD adapter and the printing apparatus.

Initially, a specific example of the negotiation process between the USB PD adapter ADP and the printing apparatus 1 will be described. FIG. 4 includes flowcharts illustrating an exemplary negotiation process between the USB PD adapter ADP and the printing apparatus 1. The negotiation process between the USB PD adapter ADP and the printing apparatus 1 starts when the USB PD adapter ADP and the printing apparatus 1 are coupled to each other with a USB cable and the USB PD adapter ADP enters a state where it is able to output the voltage signal Vpd.

When the USB PD adapter ADP and the printing apparatus 1 are coupled to each other with a USB cable and the USB PD adapter ADP enters a state where it is able to output the voltage signal Vpd, the USB PD adapter ADP verifies whether the USB cable used for the coupling is compatible for use as a power supply compliant with the USB PD standard. Specifically, the USB PD adapter ADP verifies whether an E-Marker IC is provided in the coupled USB cable (step S100).

Here, the E-Marker IC is an integrated circuit in which specification data such as the manufacturer information and current-carrying capacity of a USB cable is registered. For example, the E-Marker IC is built in one of the connectors of the USB cable. When the E-Marker IC is provided in the USB cable coupled to the USB PD adapter ADP, the USB PD adapter ADP acquires, from information registered in the E-Marker IC, information of whether the USB cable is a cable that enables current propagation compliant with the USB PD standard and information on the amount of current the propagation of which is able to be performed using the USB cable.

Thereafter, using the information acquired from the E-Marker IC and the specifications of the USB PD adapter ADP, the USB PD adapter ADP selects a combination of a rated output voltage value Vr and a rated output current value Ir that are able to be supplied to the printing apparatus 1. Then, the USB PD adapter ADP notifies the printing apparatus 1 of all of the selected combinations of the rated output voltage values Vr and the rated output current values Ir that are able to be supplied to the printing apparatus 1 (step S110).

Here, when the USB PD adapter ADP determines that no E-Marker IC is provided in the USB cable used for the coupling, the USB PD adapter ADP selects a current value that is able to be output from the USB PD adapter ADP, or a constant current value that does not cause a damage to the USB cable and that is a small current value, for example, less than or equal to 3 A, as the rated output current value Ir able to be supplied to the printing apparatus 1.

Information on the combinations of the rated output voltage values Vr and the rated output current values Ir the notification of which has been provided by the USB PD adapter ADP is input via the USB connector 110, the USB-IF 105, and the system bus 41 to the CPU 120. The CPU 120 determines whether, among the combinations of the rated output voltage values Vr and the rated output current values Ir the notification of which has been provided, a combination of the rated output voltage value Vr greater than a predetermined threshold voltage Vth1 and the rated output current value Ir greater than a predetermined threshold current Ith1 is included (step S200). Here, the threshold voltage Vth1 is, for example, the smallest voltage value at which the printing apparatus 1 is able to stably operate, and the threshold current Ith1 is, for example, the smallest value of a driving current at which the printing apparatus 1 is able to stably operate.

If the CPU 120 determines that, among the combinations of the rated output voltage values Vr and the rated output current values Ir the notification of which has been provided, the combination of the rated output voltage value Vr greater than the predetermined threshold voltage Vth1 and the rated output current value Ir greater than the predetermined threshold current Ith1 is not included (N at step S200), the CPU 120 determines that the power supplied from the coupled USB PD adapter ADP does not enable the stable operations of the printing apparatus 1 and causes the notifier 14 to provide a notification of a negotiation error indicating that the negotiation process is abnormal (step S205). Thereafter, the printing apparatus 1 terminates the negotiation process.

In contrast, the CPU 120 determines that, among the combinations of the rated output voltage values Vr and the rated output current values Ir the notification of which has been provided, the combination of the rated output voltage value Vr greater than the predetermined threshold voltage Vth1 and the rated output current value Ir greater than the predetermined threshold current Ith1 is included (Y at step S200), the CPU 120 selects a combination in which a rated output power value Wr, which is a product of the rated output voltage value Vr and the rated output current value Vth, is closest to the rated operating power Wrp of the printing apparatus 1 out of the combinations of the rated output voltage values Vr greater than the predetermined threshold voltage Vth1 and the rated output current values Ir greater than the predetermined threshold current Ith1 among the combinations of the rated output voltage values Vr and the rated output current values Ir the notification of which has been provided (step S201). Then, the CPU 120 notifies the USB PD adapter ADP of the selected combination of the rated output voltage value Vr and the rated output current value Ir via the system bus 41, the USB-IF 105, and the USB connector 110 (step S202).

When the USB PD adapter ADP determines that it is no problem that a combination of the voltage value of the voltage signal Vpd to be output and an electrical current value able to be output is the combination of the rated output voltage value Vr and the rated output current value Ir the notification of which has been provided by the printing apparatus 1, the USB PD adapter ADP notifies the printing apparatus 1 of the receipt of the combination of the rated output voltage value Vr and the rated output current value Ir, which has been requested by the printing apparatus 1 (step S120). Thereby, the voltage value of the voltage signal Vpd to be supplied and the current value able to be supplied from the USB PD adapter ADP to the printing apparatus 1 are determined.

Thereafter, the USB PD adapter ADP sets the determined rated output voltage value Vr and rated output current value Ir as output rated values (step S130) and, in response to completion of setting of the output rated values, notifies the printing apparatus 1 that the preparation for supply of the voltage signal Vpd is complete (step S140).

The notification of receipt of the combination of the rated output voltage values Vr and the rated output current value Ir output by the USB PD adapter ADP is input via the USB connector 110, the USB-IF 105, and the system bus 41 to the CPU 120. In response to input of the notification of receipt, the CPU 120 obtains information on the combination of the rated output voltage value Vr and the rated output current value Ir the notification of which has been provided to the USB PD adapter ADP at step S202, as information of the rated output voltage value Vr and the rated output current value Ir determined by the negotiation process.

That is, the information determined by the negotiation process and obtained by the CPU 120 is information of the rated output voltage value Vr and the rated output current value Ir the notification of which has been provided to the USB PD adapter ADP at step S202 and includes information on the rated output power value Wr that the USB PD adapter ADP is able to supply. The CPU 120 obtains the rated output voltage value Vr and the rated output current value Ir the notification of which has been provided to the USB PD adapter ADP at step S202, as information determined by the negotiation process between the CPU 120 and the USB PD adapter ADP (step S210). In other words, the CPU 120 obtains the rated output power value Wr, which is a product of the rated output voltage value Vr and the rated output current value Vth the notification of which has been provided to the USB PD adapter ADP at step S202.

Thereafter, the CPU 120 performs the initial setting of the printing apparatus 1 based on the obtained rated output voltage value Vr and rated output current value Ir. Specifically, the CPU 120 determines whether the obtained rated output voltage value Vr is greater than or equal to the predetermined threshold voltage Vth2 (step S220). If the CPU 120 determines that the obtained rated output voltage value Vr is greater than or equal to the predetermined threshold voltage Vth2 (Y at step S220), the CPU 120 selects a normal print mode in which the printing section 20 performs print processing at a normal speed (step S221). In contrast, if the CPU 120 determines that the obtained rated output voltage value Vr is not greater than or equal to the predetermined threshold voltage Vth2 (N at step S220), the CPU 120 selects a low speed print mode in which the printing section 20 performs print processing at a speed lower than the normal speed (step S225). Here, the normal print mode is a mode in which the transporter 23 transports a medium at a predetermined transport speed and the head driver 22 performs print processing on the medium transported at a predetermined speed, and the low speed print mode is a mode in which the transporter 23 transports a medium at a speed lower than the predetermined transport speed and the head driver 22 performs print processing on the medium transported at the lower speed.

In other words, when the rated output voltage value Vr obtained by the CPU 120 is greater than or equal to the predetermined threshold voltage Vth2 and the rated output power value Wr obtained by the CPU 120 is greater than or equal to a threshold power value Wth1, which is a product of the threshold voltage Vth2 and the rated output current value Ir, the transporter 23 transports a medium at the predetermined transport speed, whereas when the rated output voltage value Vr obtained by the CPU 120 is less than the predetermined threshold voltage Vth2 and the rated output power value Wr obtained by the CPU 120 is less than the threshold power value Wth1, which is a product of the threshold voltage Vth2 and the rated output current value Ir, the transporter 23 transports the medium at a transport speed slower than the predetermined transport speed.

When the printing section 20 performs print processing in the low speed print mode, since the transport speed of a medium is slower than in the normal print mode, much time is taken for print processing whereas the print duty for performing printing on a medium, which is the time period for driving the heating element 25 per unit time period, may be decreased. Thereby, in the low speed print mode, the printing process may be performed with small power.

When the rated output voltage value Vr is greater than or equal to the predetermined threshold voltage Vth2 and the rated output power value Wr is greater than or equal to the threshold power value Wth1, a sufficient amount of power is considered to be supplied from the USB PD adapter ADP to the printing apparatus 1. In contrast, when the rated output voltage value Vr is less than the predetermined threshold voltage Vth2 and the rated output power value Wr is less than the threshold power value Wth1, the amount of power supplied from the USB PD adapter ADP during print processing is considered to be small. In the printing apparatus 1 according to the present embodiment, when the rated output voltage value Vr is greater than or equal to the predetermined threshold voltage Vth2 and the rated output power value Wr is greater than or equal to the threshold power value Wth1, in which case a sufficient amount of power is considered to be supplied, the normal print mode in which the printing section 20 performs print processing at the normal speed is selected, whereas when the rated output voltage value Vr is less than the predetermined threshold voltage Vth2 and the rated output power value Wr is less than the threshold power value Wth1, in which case the amount of power supplied is considered to be small, the low speed print mode in which the printing section 20 performs print processing at a speed lower than the normal speed is selected. Thereby, stable print processing may be provided. Here, the threshold voltage Vth2 is, for example, a rated voltage value of the printing apparatus 1, desirably the smallest value of the rated voltage value of the printing apparatus 1.

Then, the CPU 120 determines whether the obtained rated output current value Ir is greater than or equal to a predetermined threshold current Ith2 (step S230). If the CPU 120 determines that the obtained rated output current value Ir is greater than or equal to the predetermined threshold current Ith2 (Y at step S230), the CPU 120 selects a collective print mode in which the printing section 20 performs the collective print processing (step S231). In contrast, if the CPU 120 determines that the obtained rated output current value Ir is not greater than or equal to the predetermined threshold current Ith2 (N at step S230), the CPU 120 selects a division print mode in which the printing section 20 performs the division print processing (step S235).

In other words, when the rated output current value Ir obtained by the CPU 120 is greater than or equal to the predetermined threshold current Ith2 and the rated output power value Wr obtained by the CPU 120 is greater than or equal to the threshold power value Wth2, which is a product of the rated output voltage value Vr and the threshold current Ith2, the heating element group 21*a* and the heating element group 21*b* included in the thermal head 21 simultaneously perform printing on a medium, whereas when the rated output current value Ir obtained by the CPU 120 is less than the predetermined threshold current Ith2 and the rated output power value Wr obtained by the CPU 120 is less than the threshold power value Wth2, which is a product of the rated output voltage value Vr and the threshold current Ith2, the heating element group 21*b* does not perform printing on a medium in a time period during which the heating element group 21*a* performs printing on the medium and the heating element group 21*a* does not perform printing on a medium in a time period during which the heating element group 21*b* performs printing on the medium.

In the collective print processing, as described above, the heating element group 21*a* and the heating element group 21*b* included in the thermal head 21 simultaneously perform printing on a medium. Therefore, the instantaneous amount of power during print processing increases. In contrast, in the division print processing, as described above, the heating element group 21*b* included in the thermal head 21 does not perform printing on a medium in a time period during which the heating element group 21*a* included in the thermal head 21 performs printing on the medium, and the heating element group 21*a* does not perform printing on a medium in a time period during which the heating element group 21*b* performs printing on the medium. Therefore, although the time period taken for print processing is longer than in the collective print processing, the amount of power during print processing may be smaller than in the collective print processing.

When the rated output current value Ir is greater than or equal to the predetermined threshold current Ith2, a sufficient amount of power is considered to be supplied from the USB PD adapter ADP during print processing. In contrast, when the rated output current value Ir is less than the predetermined threshold current Ith2, the amount of power supplied from the USB PD adapter ADP during print processing is small. In the printing apparatus 1 according to the present embodiment, when the rated output current value Ir is greater than or equal to the predetermined threshold current Ith2, in which case a sufficient amount of power is obtained, the collective print mode is set, whereas when the rated output current value Ir is less than the predetermined threshold current Ith2, in which case the amount of power decreases, the division print mode is set, thereby reducing the possibility of an insufficient current amount to be used for print processing, which may result in implementation of stable print processing. Here, the threshold current Ith2 is, for example, a rated current value of the printing apparatus 1, desirably the smallest value of the rated current value of the printing apparatus 1.

When the initial setting of the printing apparatus 1 as described above is complete and a notification of completion of the setting, in which the rated output voltage value Vr and the rated output current value Ir are the output rated values, is input from the USB PD adapter ADP, the printing apparatus 1 notifies the USB PD adapter ADP that preparation for receiving power is complete (step S240). In response to receiving a notification that preparation for receiving power in the printing apparatus 1 is complete, the USB PD adapter ADP outputs the voltage signal Vpd of which the voltage value is the rated output voltage value Vr (step S150). Thereby, the negotiation process between the USB PD adapter ADP and the printing apparatus 1 is complete.

Figure 5:
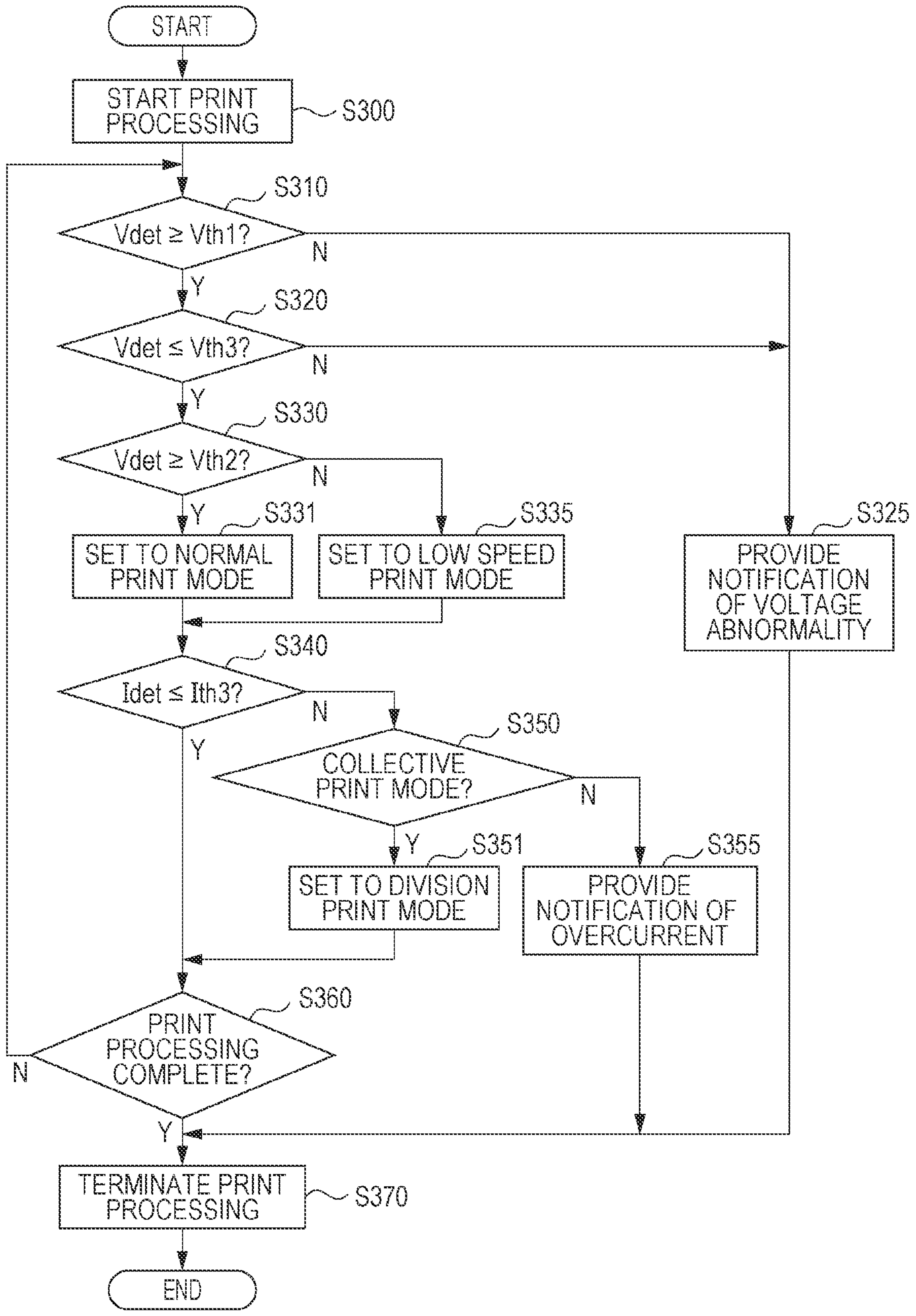
FIG. 5 is a flowchart illustrating exemplary operations of the printing apparatus.

3.2 Monitoring of Supplied Power and Operations of Printing Apparatus while Print Processing is Performed Operations of the printing apparatus 1 upon completion of the negotiation process will now be described. FIG. 5 is a flowchart illustrating exemplary operations of the printing apparatus 1. After the supply of power from the USB PD adapter ADP has started upon completion of the negotiation process described above, the printing apparatus 1 starts print processing in response to input of the printing request signal Pr from the operation section 16 (step S300).

In a time period during which print processing is executed, the voltage/current detector 107 detects the voltage value of the voltage signal Vpd input via the VBUS terminal 111 and the value of a current resulting from the propagation of the voltage signal Vpd. In the description given below, the voltage value of the voltage signal Vpd detected by the voltage/current detector 107 will be referred to as a detected voltage Vdet, and the value of a current resulting from the propagation of the voltage signal Vpd detected by the voltage/current detector 107 will be referred to as a detected current Idet.

After the printing apparatus 1 has started the print processing, the voltage/current detector 107 determines whether the detected voltage Vdet is greater than or equal to the threshold voltage Vth1 (step S310). Here, the threshold voltage Vth1 is the smallest voltage value at which the printing apparatus 1 is able to stably operate as described above. In addition, after the voltage/current detector 107 has determined that the detected voltage Vdet is greater than or equal to the threshold voltage Vth1 (Y at step S310), the voltage/current detector 107 determines whether the detected voltage Vdet is less than or equal to the threshold voltage Vth3 (step S320). Here, the threshold voltage Vth3 is a determination threshold for determining whether an overvoltage abnormality has occurred in the printing apparatus 1. That is, at step S310 and step S320, the voltage/current detector 107 determines whether the voltage value of the voltage signal Vpd actually supplied from the USB PD adapter ADP is within the range where the printing apparatus 1 is able to operate stably.

If the voltage/current detector 107 determines that the detected voltage Vdet is less than the threshold voltage Vth1 (N at step S310) or if the voltage/current detector 107 determines that the detected voltage Vdet exceeds the threshold voltage Vth3 (N at step S320), the voltage/current detector 107 determines that the voltage value of the voltage signal Vpd supplied from the USB PD adapter ADP is abnormal. Then, the voltage/current detector 107 notifies the CPU 120 via the USB-IF 105 of an abnormality in the voltage of the voltage signal Vpd, and the CPU 120 causes the notifier 14 to provide a notification of the abnormality in the voltage of the voltage signal Vpd input from the voltage/current detector 107. That is, if the voltage/current detector 107 determines that the detected voltage Vdet is less than the threshold voltage Vth1 (N at step S310) or if the voltage/current detector 107 determines that the detected voltage Vdet exceeds the threshold voltage Vth3 (N at step S320), the notifier 14 provides a notification of the abnormality in the voltage of the voltage signal Vpd (step S325). In other words, when the voltage value of the voltage signal Vpd detected by the voltage/current detector 107 is less than the threshold voltage Vth1 or when the voltage value of the voltage signal Vpd detected by the voltage/current detector 107 exceeds the threshold voltage Vth3, the notifier 14 provides a notification of abnormality information. Then, after the notifier 14 has provided a notification of the abnormality in the voltage of the voltage signal Vpd, the printing apparatus 1 completes the print processing (step S370).

Here, the printing apparatus 1 may terminate the print processing when the notifier 14 has provided a notification of an abnormality in the voltage of the voltage signal Vpd continuously for a fixed period of time, and may also terminate the print processing when the notifier 14 has provided a notification of the abnormality in the voltage of the voltage signal Vpd a predetermined number of times or more within a predetermined period of time. Step S310 and step S320 described above may be performed in the reverse order or may be performed simultaneously.

After the voltage/current detector 107 has determined that the detected voltage Vdet is greater than or equal to the threshold voltage Vth1 (Y at step S310) and has determined that the detected voltage Vdet is less than or equal to the threshold voltage Vth3 (Y at step S320), the voltage/current detector 107 determines whether the detected voltage Vdet is greater than or equal to the threshold voltage Vth2 (step S330). Here, the threshold voltage Vth2 is a rated voltage value of the printing apparatus 1, which is the smallest value of the rated voltage value of the printing apparatus 1, as mentioned above.

Then, if the voltage/current detector 107 determines that the detected voltage Vdet is greater than or equal to the threshold voltage Vth2 (Y at step S330), the voltage/current detector 107 determines that a sufficient amount of power is supplied to the printing apparatus 1, and notifies the CPU 120 via the USB-IF 105 of a determination result. The CPU 120 causes the printing section 20 to operate in the normal print mode based on the determination result input from the voltage/current detector 107. That is, the printing apparatus 1 is set to the normal print mode (step S331).

In contrast, if the voltage/current detector 107 determines that the detected voltage Vdet is not greater than or equal to the threshold voltage Vth2 (N at step S330), the voltage/current detector 107 determines that the power supplied to the printing apparatus 1 is insufficient, and notifies the CPU 120 via the USB-IF 105 of a determination result. The CPU 120 causes the printing section 20 to operate in the low speed print mode based on the determination result input from the voltage/current detector 107. That is, the printing apparatus 1 is set to the low speed print mode (step S335).

Here, if the voltage/current detector 107 determines that the detected voltage Vdet is greater than or equal to the threshold voltage Vth2 (Y at step S330) when the printing apparatus 1 operates in the normal print mode, the printing apparatus 1 continues the normal print mode. Therefore, step S331 described above may be omitted. Similarly, if the voltage/current detector 107 determines that the detected voltage Vdet is not greater than or equal to the threshold voltage Vth2 (N at step S330) when the printing apparatus 1 operates in the low speed print mode, the printing apparatus 1 continues the low speed print mode. Therefore, step S335 described above may be omitted.

As described above, in printing apparatus 1 according to the present embodiment, when the voltage value of the voltage signal Vpd detected by the voltage/current detector 107 is less than or equal to the threshold voltage Vth3 and when the voltage value of the voltage signal Vpd detected by the voltage/current detector 107 is greater than or equal to the threshold voltage Vth1, at least one of the heating element group 21*a* and the heating element group 21*b* performs printing on a medium.

Then, the voltage/current detector 107 determines whether the detected current Idet that has been detected is less than or equal to a predetermined threshold current Ith3 (step S340). Here, the threshold current Ith3 is a determination threshold for determining whether an overcurrent has occurred in the printing apparatus 1. If the voltage/current detector 107 determines that the detected current Idet that has been detected exceeds the threshold current Ith3 (N at step S340), the voltage/current detector 107 determines that an overcurrent abnormality has occurred in the printing apparatus 1. Then, the voltage/current detector 107 notifies the CPU 120 via the USB-IF 105 of an overcurrent abnormality. In response to information indicating the overcurrent being input from the voltage/current detector 107, the CPU 120 determines whether the printing section 20 performs printing in the collective print mode or performs printing in the division print mode. That is, the CPU 120 determines whether the printing section 20 performs printing in the collective print mode (step S350). If the CPU 120 determines that the printing section 20 performs printing in the collective print mode (Y at step S350), the CPU 120 causes the printing section 20 to operate in the division print mode. That is, the printing apparatus 1 is set to the division print mode (step S351).

In contrast, if the CPU 120 determines that the printing section 20 does not perform printing in the collective print mode (N at step S350), that is, if the CPU 120 determines that the printing section 20 performs printing in the division print mode, the CPU 120 causes the notifier 14 to provide a notification of an overcurrent. Thereby, the notifier 14 provides the notification of an overcurrent abnormality (step S355). Then, after the notifier 14 has provided the notification of an overcurrent, the printing apparatus 1 completes the print processing (step S370).

If the voltage/current detector 107 determines that the detected current Idet that has been detected is less than or equal to the threshold current Ith3 (N at step S340) or after the CPU 120 has set the printing section 20 to the division print mode (step S351), the CPU 120 determines whether the print processing in the printing apparatus 1 is complete (step S360).

If the CPU 120 determines that the print processing is not complete (N at step S360), the voltage/current detector 107 determines again whether the detected voltage Vdet is greater than or equal to the threshold voltage Vth1 (step S310). That is, during the time period until the print processing is complete, the voltage/current detector 107 continues to detect the voltage value of the voltage signal Vpd input via the VBUS terminal 111 and the value of a current resulting from the propagation of the voltage signal Vpd. In contrast, if the CPU 120 determines that the print processing is complete (Y at step S360), the printing apparatus 1 terminates the print processing (step S370).

As described above, in the time period during which print processing is performed, the printing apparatus 1 according to the present embodiment continues to detect the voltage value of the voltage signal Vpd input via the VBUS terminal 111 and the value of a current resulting from the propagation of the voltage signal Vpd. Then, in accordance with the detected voltage value of the voltage signal Vpd input via the VBUS terminal 111 and the detected value of a current resulting from the propagation of the voltage signal Vpd, the CPU 120 changes the operating state of the printing apparatus 1. Thereby, even when the voltage signal Vpd with a voltage value different from the voltage value determined by the negotiation process is supplied to the printing apparatus 1 because an abnormality has occurred in the USB PD adapter ADP that supplies power to the printing apparatus 1, the possibility of a decrease in the stability of operations of the printing apparatus 1 is reduced.

Here, the voltage signal Vpd is an exemplary DC voltage, information including the rated output voltage value Vr, the rated output current value Ir, and the rated output power value Wr obtained through the negotiation process by the CPU 120 is exemplary negotiation information, and the rated output power value Wr is an exemplary rated power value. In addition, the heating element group 21*a* is an exemplary first printing section, the heating element group 21*b* is an exemplary second printing section, the CPU 120 is an exemplary negotiation information obtainer, and the voltage/current detector 107 is an exemplary voltage detector. In addition, the threshold power value Wth2 is an exemplary first predetermined value, the threshold power value Wth1 is an exemplary second predetermined value, the threshold voltage Vth3 is an exemplary third predetermined value, and the threshold current Ith3 is an exemplary fourth predetermined value. Furthermore, a predetermined speed at which a medium is transported is an exemplary first speed, and a speed lower than the predetermined speed is an exemplary second speed.

4. Operations and Advantages

As described above, in the printing apparatus 1 according to the present embodiment, when the rated output power value Wr obtained by a negotiation process between the printing apparatus 1 and the USB PD adapter ADP is greater than or equal to the threshold power value Wth2, the heating element group 21*a* and the heating element group 21*b* included in the thermal head 21 simultaneously perform printing on a medium, whereas when the rated output power value Wr obtained by the negotiation process between the printing apparatus 1 and the USB PD adapter ADP is less than the threshold power value Wth2, the heating element group 21*b* does not perform printing on a medium in a time period during which the heating element group 21*a* performs printing on the medium and the heating element group 21*a* does not perform printing on a medium in a time period during which the heating element group 21*b* performs printing on the medium. That is, it is expected based on the rated output power value Wr obtained by the negotiation process between the printing apparatus 1 and the USB PD adapter ADP that a sufficient amount of power will not be supplied to the printing apparatus 1, the printing apparatus 1 performs the division print processing with low power consumption. This reduces the possibility of a decrease in the stability of operations of the printing apparatus 1 due to an insufficient supply of power when the printing apparatus 1 performs print processing.

Accordingly, in the perspective of responsible consumption and production, which is one of the Sustainable Development Goals (SDGs), even when the USB PD adapter ADP is not included with the printing apparatus 1 and the USB PD adapter ADP with non-specific specifications in the possession of the user is used, the possibility of a decrease in the stability of operations of the printing apparatus 1 is reduced.

Furthermore, in the printing apparatus 1 according to the present embodiment, when the rated output power value Wr obtained by the negotiation process between the printing apparatus 1 and the USB PD adapter ADP is greater than or equal to the threshold power value Wth1, the transporter 23 transports a medium at the predetermined transport speed, whereas when the rated output power value Wr obtained by the negotiation process between the printing apparatus 1 and the USB PD adapter ADP is less than the threshold power value Wth1, the transporter 23 transports the medium at a transport speed slower than the predetermined transport speed. That is, it is expected based on the rated output power value Wr obtained by the negotiation process between the printing apparatus 1 and the USB PD adapter ADP that a sufficient amount of power will not be supplied to the printing apparatus 1, the printing apparatus 1 performs the print processing in the low speed print mode where the power consumption is low. This further reduces the possibility of a decrease in the stability of operations of the printing apparatus 1 due to an insufficient supply of power when the printing apparatus 1 performs print processing.

Accordingly, in the perspective of responsible consumption and production, which is one of the Sustainable Development Goals (SDGs), even when the USB PD adapter ADP is not included with the printing apparatus 1 and the USB PD adapter ADP with non-specific specifications in the possession of the user is used, the possibility of a decrease in the stability of operations of the printing apparatus 1 is further reduced.

Furthermore, in the printing apparatus 1 according to the present embodiment, when the voltage value of the voltage signal Vpd detected by the voltage/current detector 107 is less than the threshold voltage Vth1 or when the voltage value of the voltage signal Vpd detected by the voltage/current detector 107 exceeds the threshold voltage Vth3, the notifier 14 provides a notification of abnormality information, whereas when the voltage value of the voltage signal Vpd detected by the voltage/current detector 107 is less than the threshold voltage Vth3 and when the voltage value of the voltage signal Vpd detected by the voltage/current detector 107 is greater than or equal to the threshold voltage Vth1, at least one of the heating element group 21*a* and the heating element group 21*b* performs printing on a medium. That is, the printing apparatus 1 selects an optimum operating mode in accordance with the voltage value of the voltage signal Vpd actually supplied from the USB PD adapter ADP, and further, when an abnormality has occurred in the voltage value of the voltage signal Vpd actually supplied from the USB PD adapter ADP, the printing apparatus 1 notifies the user of the abnormality.

Thereby, when an abnormality has occurred in the voltage value of the voltage signal Vpd output by the USB PD adapter ADP coupled to the printing apparatus 1, the possibility of a decrease in the stability of operations of the printing apparatus 1 is reduced by the continuous operations of the printing apparatus 1.

Accordingly, in the perspective of responsible consumption and production, which is one of the Sustainable Development Goals (SDGs), when the USB PD adapter ADP is not included with the printing apparatus 1 and the USB PD adapter ADP with non-specific specifications in the possession of the user is used, the possibility of a decrease in the stability of operations of the printing apparatus 1 is reduced even when an abnormality has occurred in the used USB PD adapter ADP.

Although embodiments and modifications have been described above, the present disclosure is not limited to these embodiments and may be implemented in various aspects without departing from the spirit and scope of the disclosure. For example, the embodiments described above may be combined as appropriate.

The present disclosure includes configurations that are substantially the same (for example, the configurations that are the same in functions, methods, and results or the configurations that are the same in objects and advantages) as the configurations described in the embodiments. In addition, the present disclosure includes a configuration in which non-essential part of the configuration described in the embodiments is included. In addition, the present disclosure includes configurations that achieve the same operations and advantages as the configurations described in the embodiments or configurations that may achieve the same purposes as the configurations described in the embodiments. In addition, the present disclosure includes a configuration in which known techniques are added to the configuration described in the embodiments.

The following content is derived from the embodiments described above.

According to an aspect of the present disclosure, provided is a printing apparatus that operates by receiving power from a Universal Serial Bus (USB) Power Delivery (PD) adapter outputting a direct current (DC) voltage according to USB PD standard, the USB PD adapter being not included with the printing apparatus, the printing apparatus including: a first printing section configured to perform printing on a medium; a second printing section configured to perform printing on the medium; and a negotiation information obtainer configured to obtain negotiation information between the printing apparatus and the USB PD adapter. The negotiation information includes a rated power value able to be supplied from the USB PD adapter. When the rated power value is greater than or equal to a first predetermined value, the first printing section and the second printing section are configured to simultaneously perform printing on the medium. When the rated power value is less than the first predetermined value, the second printing section is configured to not perform printing on the medium during a time period in which the first printing section performs printing on the medium, and the first printing section is configured to not perform printing on the medium during a time period in which the second printing section performs printing on the medium.

With this printing apparatus, when a rated power value that is able to be supplied from the USB PD adapter, which is included in negotiation information between the printing apparatus and the USB PD adapter, is greater than or equal to the first predetermined value, the first printing section and the second printing section simultaneously perform printing on a medium, whereas when the rated power value is less than the first predetermined value, the second printing section does not perform printing on a medium in a time period during which the first printing section performs printing on the medium and the first printing section does not perform printing on a medium in a time period during which the second printing section performs printing on the medium. That is, when a rated power value that is able to be supplied from the USB PD adapter, which is included in negotiation information between the printing apparatus and the USB PD adapter, is greater than or equal to the first predetermined value and thus a sufficient amount of power is supplied to the printing apparatus, the first printing section and the second printing section simultaneously perform printing on a medium, thereby improving the print speed, whereas when the rated power value that is able to be supplied from the USB PD adapter, which is included in negotiation information between the printing apparatus and the USB PD adapter, is less than the first predetermined value and thus a sufficient amount of power is not supplied to the printing apparatus, the second printing section does not perform printing on a medium in a time period during which the first printing section performs printing on the medium and the first printing section does not perform printing on a medium in a time period during which the second printing section performs printing on the medium, thereby reducing the power consumption of the printing apparatus. That is, in accordance with negotiation information between the printing apparatus and the USB PD adapter, the operating state of the printing apparatus is switched. Thereby, even when the USB PD adapter held by the user is used, the possibility of a decrease in the stability of operations of the printing apparatus due to an insufficient supply of power is reduced.

Accordingly, in the perspective of responsible consumption and production, which is one of the Sustainable Development Goals (SDGs), even when the USB PD adapter is not included with the printing apparatus and the USB PD adapter with non-specific specifications in the possession of the user is used, the possibility of a decrease in the stability of operations of the printing apparatus is reduced.

The printing apparatus according to the aspect may further include a transporter configured to transport the medium. When the rated power value is greater than or equal to a second predetermined value, the transporter may be configured to transport the medium at a first speed. When the rated power value is less than the second predetermined value, the transporter may be configured to transport the medium at a second speed slower than the first speed.

With this printing apparatus, when a rated power value that is able to be supplied from the USB PD adapter, which is included in negotiation information between the printing apparatus and the USB PD adapter, is greater than or equal to the second predetermined value, the transporter transports the medium at the first speed, whereas when the rated power value is less than the second predetermined value, the transporter transports the medium at the second speed slower than the first speed. That is, when the rated power value that is able to be supplied from the USB PD adapter, which is included in negotiation information between the printing apparatus and the USB PD adapter, is greater than or equal to the second predetermined value such that sufficient power is supplied to the printing apparatus, printing is performed at high speed, whereas when the rated power value that is able to be supplied from the USB PD adapter is less than the second predetermined value such that sufficient power is supplied to the printing apparatus, the print duty is decreased, which may reduce the power consumption. That is, in accordance with negotiation information between the printing apparatus and the USB PD adapter, the operating state of the printing apparatus is switched. Thereby, even when the USB PD adapter held by the user is used, the possibility of a decrease in the stability of operations of the printing apparatus due to an insufficient supply of power is further reduced.

Accordingly, in the perspective of responsible consumption and production, which is one of the Sustainable Development Goals (SDGs), even when the USB PD adapter is not included with the printing apparatus and the USB PD adapter with non-specific specifications in the possession of the user is used, the possibility of a decrease in the stability of operations of the printing apparatus is further reduced.

The printing apparatus according to the aspect may further include: a voltage detector configured to detect a voltage value of the DC voltage supplied from the USB PD adapter, and a notifier configured to notify a user of information. When the voltage value of the DC voltage detected by the voltage detector exceeds a third predetermined value, the notifier may be configured to provide a notification of abnormality information. When the voltage value of the DC voltage detected by the voltage detector is less than or equal to the third predetermined value, at least one of the first printing section or the second printing section may perform printing on the medium.

With this printing apparatus, when the voltage value of a DC voltage supplied from the USB PD adapter exceeds the third predetermined value, the notifier provides a notification of abnormality information, whereas when the voltage value of the DC voltage is less than or equal to the third predetermined value, at least one of the first printing section and the second printing section performs printing on a medium. This enables the operations of the printing apparatus to be stopped if an abnormality has occurred actually in the voltage value of a DC voltage supplied from the USB PD adapter even after the negotiation process has been completed.

Accordingly, in the perspective of responsible consumption and production, which is one of the Sustainable Development Goals (SDGs), when the USB PD adapter is not included with the printing apparatus and the USB PD adapter in the possession of the user is used, the possibility of a decrease in the stability of operations of the printing apparatus is reduced even if an abnormality has occurred in the USB PD adapter.

The printing apparatus according to the aspect may further include: a voltage detector configured to detect a voltage value of the DC voltage supplied from the USB PD adapter, and a notifier configured to notify a user of information. When the voltage value of the DC voltage detected by the voltage detector is greater than or equal to a fourth predetermined value, at least one of the first printing section or the second printing section may perform printing on the medium. When the voltage value of the DC voltage detected by the voltage detector is less than the fourth predetermined value, the notifier may be configured to provide a notification of abnormality information.

With this printing apparatus, when the voltage value of a DC voltage supplied from the USB PD adapter exceeds the fourth predetermined value, at least one of the first printing section and the second printing section performs printing on a medium, whereas when the voltage value of the DC voltage is less than or equal to the fourth predetermined value, the notifier provides a notification of abnormality information. This enables the operations of the printing apparatus to be stopped if an abnormality has occurred actually in the voltage value of the DC voltage supplied from the USB PD adapter even after the negotiation process has been completed.

Accordingly, in the perspective of responsible consumption and production, which is one of the Sustainable Development Goals (SDGs), when the USB PD adapter ADP is not included with the printing apparatus and the USB PD adapter ADP in the possession of the user is used, the possibility of a decrease in the stability of operations of the printing apparatus is reduced even if an abnormality has occurred in the USB PD adapter.

What is claimed is:

1. A printing apparatus that operates by receiving power from a Universal Serial Bus (USB) Power Delivery (PD) adapter outputting a direct current (DC) voltage according to USB PD standard, the USB PD adapter being not included with the printing apparatus, the printing apparatus comprising:

- a first printing section configured to perform printing on a medium;
- a second printing section configured to perform printing on the medium; and
- a negotiation information obtainer configured to obtain negotiation information between the printing apparatus and the USB PD adapter, wherein
- the negotiation information includes a rated power value able to be supplied from the USB PD adapter,
- when the rated power value is greater than or equal to a first predetermined value, the first printing section and the second printing section are configured to simultaneously perform printing on the medium, and
- when the rated power value is less than the first predetermined value, the second printing section is configured to not perform printing on the medium during a time period in which the first printing section performs printing on the medium, and the first printing section is configured to not perform printing on the medium during a time period in which the second printing section performs printing on the medium.

2. The printing apparatus according to claim 1, further comprising:

- a transporter configured to transport the medium, wherein
- when the rated power value is greater than or equal to a second predetermined value, the transporter is configured to transport the medium at a first speed, and
- when the rated power value is less than the second predetermined value, the transporter is configured to transport the medium at a second speed slower than the first speed.

3. The printing apparatus according to claim 1, further comprising:

- a voltage detector configured to detect a voltage value of the DC voltage supplied from the USB PD adapter; and
- a notifier configured to notify a user of information, wherein
- when the voltage value of the DC voltage detected by the voltage detector exceeds a third predetermined value, the notifier is configured to provide a notification of abnormality information, and
- when the voltage value of the DC voltage detected by the voltage detector is less than or equal to the third predetermined value, at least one of the first printing section or the second printing section performs printing on the medium.

4. The printing apparatus according to claim 1, further comprising:

- a voltage detector configured to detect a voltage value of the DC voltage supplied from the USB PD adapter; and
- a notifier configured to notify a user of information, wherein
- when the voltage value of the DC voltage detected by the voltage detector is greater than or equal to a fourth predetermined value, at least one of the first printing section or the second printing section performs printing on the medium, and
- when the voltage value of the DC voltage detected by the voltage detector is less than the fourth predetermined value, the notifier is configured to provide a notification of abnormality information.

* * * * *